United States Patent Office 3,429,834
Patented Feb. 25, 1969

---

3,429,834
DIOL OF POLY(BUTENE-2-OXIDE)S
Edwin J. Vandenberg, Wilmington, Del., assignor to Hercules Incorporated, Wilmington, Del., a corporation of Delaware
No Drawing. Continuation-in-part of application Ser. No. 298,434, July 29, 1963. This application Mar. 2, 1964, Ser. No. 348,764
U.S. Cl. 260—2        7 Claims
Int. Cl. C08g 23/04; C07c 43/04, 41/02

This application is a continuation-in-part of my co-pending application Ser. No. 298,434, filed July 29, 1963 now U.S. Patent 3,337,487.

This invention relates to new high molecular weight dihydroxy polyethers and more particularly to diols of poly(butene-2 oxide)s.

In U.S. 3,065,187 there are described high molecular weight crystalline polyethers prepared from cis-butene-2 oxide and from trans-butene-2 oxide. These new polymers have many uses and are of particular value in the preparation of films and molded articles.

Now in accordance with this invention it has been found that these poly(butene-2 oxide)s can be cleaved to produce polyethers having a terminal hydroxyl group at each end of the polymer chain. These new hydroxyl ended polyethers may be defined as diols of poly(butene-2 oxide)s wherein each of the hydroxyls is terminal and which have a number average molecular weight of from about 1,000 to about 20,000 and preferably from about 2,000 to about 10,000. These new diols are very useful in the production of polyurethanes because of their long chains containing ether linkages which contribute to the flexibility of the polymer.

The poly(cis- or trans-butene-2 oxide) is readily cleaved to the hydroxyl ended diol by reacting the polymer with an organometallic compound of an alkali metal and then treating the cleavage product with aqueous acid to hydrolyze the end groups to hydroxyl groups. In this cleavage reaction, the organometallic compound (LiR') reacts with the poly(butene-2 oxide) to abstract hydrogen from a carbon atom beta to an ether linkage, with cleavage between the oxygen and the carbon atom alpha to it. In a poly(butene-2 oxide) there are hydrogens attached to four carbon atoms that are beta to a given ether linkage, two on each side of the ether oxygen. Hence there would appear to be possible cleavage reactions involving four different beta hydrogens for each ether linkage. However, because of the symmetry of the butene-2 oxide structure, the two beta hydrogens on one side of the ether linkage are equivalent to the two beta on the other side, so the end result is the same whether cleavage takes place on one side or the other of the ether linkage. The following equations illustrate the theory of the cleavage and hydrolysis reactions as they are believed to take place. Equations (1) and (2) illustrate the two types of cleavage reactions that can occur when all of one type of beta hydrogen is involved. In addition, Equation (3) is given to illustrate the combination of left and right side cleavage. Obviously, in any one cleavage reaction, there will undoubtedly take place all of these various types of cleavages. Consequently, the end product will be a mixture of these cleavage products. As will be seen from these equations, under some conditions, part of the end groups in the cleavage product contain double bonds, e.g. propenyl in Product A and allyl in Product B. The propenyl end groups are readily hydrolyzed by acid washing to hydroxyl end groups. The allyl end groups isomerize under the influence of the LiR' or LiOR' present in the reaction mixture to propenyl end groups which are readily converted to hydroxyl end groups by acid hydrolysis as shown in Equation (6). Under other conditions, e.g., with excess organometallic, the double bond end groups can be further cleaved to convert them directly to LiO- end groups, as shown in Equations (4) and (5), which are readily converted to hydroxyl end groups by water washing as shown in Equation (7). Thus is some cases, the direct reaction product of the cleavage contains alkali metal alkoxide end groups which are useful as such, without being hydrolyzed, for carrying out further reactions.

Left Side Cleavage

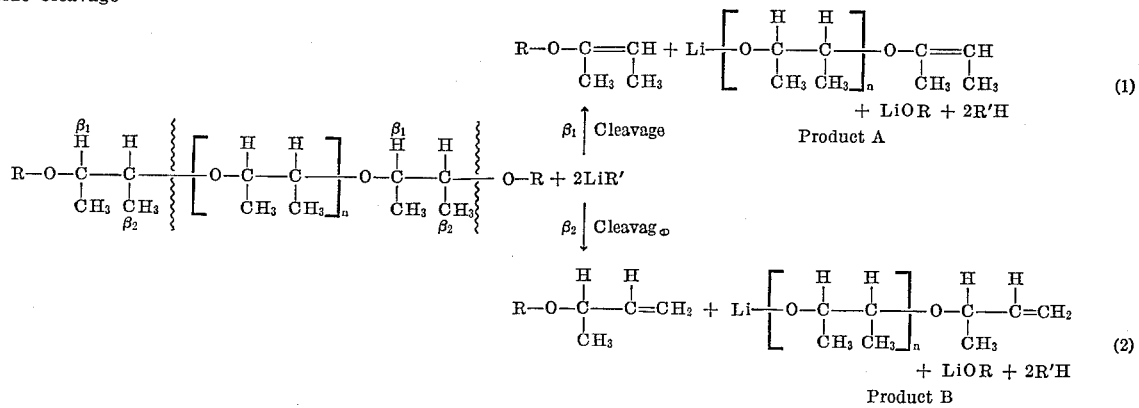

Left Side and Right Side Cleavage
Involving Both $\beta_1$ and $\beta_2$ Hydrogens

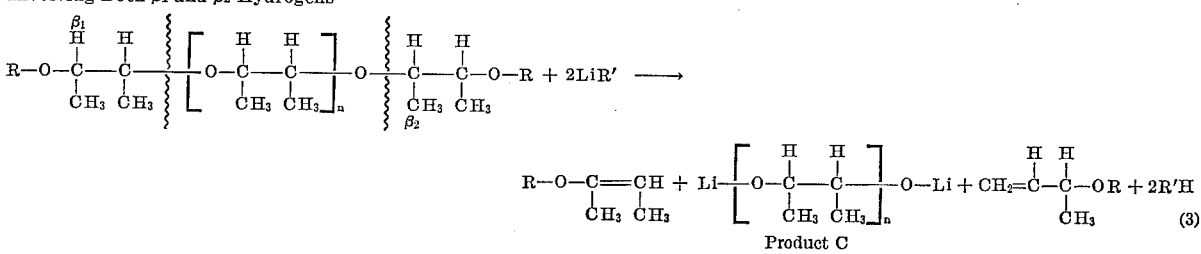

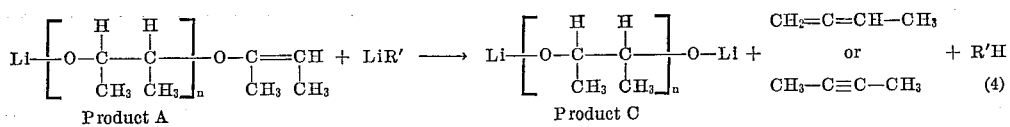
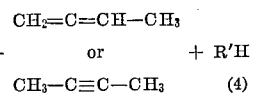

Product A              Product C

↑ isomerizes     or + LiR' further cleavage

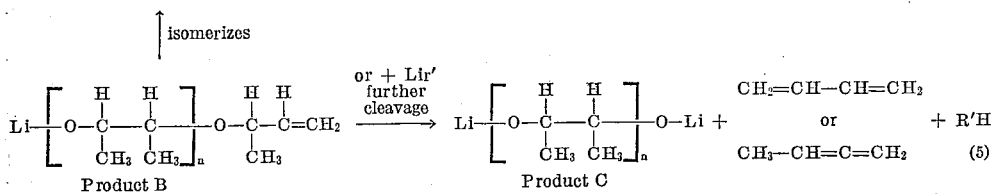
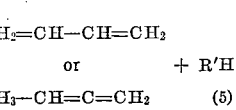

Product B              Product C

Hydrolysis of Product A

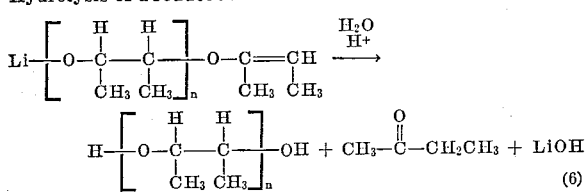

Hydrolysis of Product C

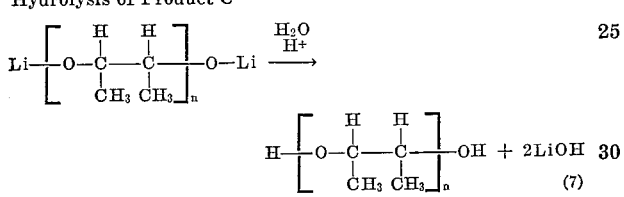

The cleavage reaction is carried out by reacting the poly(butene-2 oxide) with an organometallic compound of an alkali metal. Any organometallic compound of an alkali metal, i.e., lithium, sodium, potassium, rubidium or cesium, can be used. The organo moiety will preferably be a hydrocarbon group as, for example, an alkyl, aryl, alkenyl, alkynyl, cycloalkyl, cycloalkenyl, or aralkyl, etc., group. Exemplary of the alkali metal organometallic compounds that can be used are methyllithium, ethyllithium, isopropyllithium, n-butyllithium, isobutyllithium, tert-butyllithium, amyllithium, decyllithium, octadecyllithium, cyclohexyllithium, cyclohexenyllithium, phenyllithium, naphthyllithium, vinyl lithium, lithium acetylide, methylsodium, ethylsodium, propylsodium, isopropylsodium, the butyl sodiums, amylsodium, dodecylsodium, benzylsodium, isopropenylsodium, allylsodium, octadecenylsodium, butadienylsodium, isopropenylsodium, butylrubidium, butylcesium, methyl-, ethyl-, propyl- and butylpotassium, phenylpotassium, octylpotassium, phenylpotassium, allylpotassium, cyclopentylpotassium, cyclohexenylpotassium, etc. The amount of the organometallic compound used will depend upon the amount of cleavage desired, at least one molecule of the organometallic being required for each cleavage, i.e., per two chain ends, and as shown in the foregoing reactions may use as much as two moles per cleavage. Thus, the amount of organometallic compound can vary from about 1% up to a large excess as, for example, 5 to 10 times the weight of the polymer being cleaved, but preferably will vary from about 1% to about 100% by weight of the polymer being cleaved.

The cleavage process can be carried out in the absence of a diluent, i.e., a bulk process, but preferably is carried out in a diluent which may be a solvent for the polymer being cleaved or which may serve only a dispersant for the polymer. Any organic liquid diluent that is inert under the reaction conditions can be used as, for example, aromatic hydrocarbons such as benzene, toluene, xylene, etc., aliphatic and cycloaliphatic hydrocarbons such as hexane, n-heptane, cyclohexane, etc., and mixtures of such hydrocarbons as, for example, petroleum ether, gasoline, etc. Diluents that are capable of reaction with the organometallic compound, as for example, ethers, can also be used provided that the rate of reaction of the organometallic with the polymer being cleaved exceeds the rate of reaction with the diluent. The concentration of the polymer in the diluent can vary from a fraction of 1% up to an essentially diluent-free system. As already mentioned, the polymer can be dissolved in the diluent or a slurry of the polymer in a diluent can be used. Generally, it is preferred to use conditions such that the polymer solution or dispersion is stirrable. Usually the polymer concentration will be in the 2 to 50% range. As noted above, the process can be operated in the absence of a diluent, particularly in the case of polymers which on cleavage become more and more fluid, or by carrying out the process in an extruder after which the cleaved fluid product can be handled in more conventional equipment in a continuous process.

The cleavage reaction can be carried out over a wide temperature range, generally from about $-50°$ C. to about $200°$ C. depending on the organometallic compound, the stability of the organometallic compound, etc. Preferably, the reaction is carried out at a temperature of from about $-20°$ C. to about $150°$ C. and more preferably from about $0°$ C. to about $125°$ C. The pressure can be atmospheric, subatmospheric or above atmospheric, if desired. In fact, pressures up to several thousand pounds can be used if needed to keep the diluent in the liquid state.

To produce the diols of this invention, the reaction product from the above cleavage reaction must be treated to remove the alkali metal ions. This can be easily accomplished by simply washing the reaction mixture with water (basic, neutral or acidic) or with a weak acid solution (aqueous or non-aqueous), as for example, dilute aqueous hydrochloric acid, formic acid, acetic acid, oxalic acid, sulfuric acid, sulfurous acid, nitric acid, sulfonic acid, carbonic acid, etc. With the aqueous acid treatment, any propenyl, vinyl, etc., end groups are hydrolyzed to the corresponding hydroxyl end group.

The poly(butene-2 oxide) diols can be prepared in a wide variety of molecular weights depending on the molecular weight of the starting polymer and the amount of cleavage to which it is subjected. Preferably the polymer that is cleaved will be one of fairly high molecular weight so that the original end groups in the polymer being cleaved are an insignificant part of the total final end groups, and the major portion of the individual polymer molecules in the cleaved product will then have active hydrogen end groups on both ends. The polymer being cleaved will preferably have a chain of at least about 100 of said monomer groups and more preferably at least about 500. The actual molecular weight of the polymer being cleaved and the number of cleavages per polymer molecule desired will, of course, depend on the purpose for which the final diol is to be used.

Because the new diols of this invention are polyethers having hydroxyl groups at each of the polymer chain, they can be used in various chain extension reactions. The chain extending agents can be any polyfunctional compound which reacts under appropriate temperature, pressure and catalyst with hydroxyl groups. They can be di- or polyisocyanate such as m- or p-phenylene diisocyanate, 2,4-toluene diisocyanate, 1,5-naphthyl diisocyanate, methylene di(p-phenyl diisocyanate), hexamethylene diisocyanate, triphenyl methane triisocyanate, etc.; di- or polyepoxides such as Epon resins, as for example, the diglycidyl ether of Bis Phenol-A, or di- or tri-aziridines as, for example, tris[1-(2-methyl)aziridinyl] phosphine oxide, tris(1-aziridinyl) phosphine oxide, or di- or poly-anhydrides such as pyromellitic anhydride, or di- or poly-imides such as phenylene bis-maleimide, etc. The difunctional chain extending agents are generally used in approximately stoichiometric amounts to the active chain ends when a linear, soluble high polymer product is desired. When the chain extending agent contains more than 2 functional groups and is used in approximately stoichiometric amounts to the active chain ends, the product is generally a cross-linked product. Alternatively, a cross-linked network can be obtained by using a combination of a difunctional active chain end polymer with low molecular weight similar poly-reactive compounds. Thus, the diols of this invention, having hydroxyls on both ends of the polymer chain, on combination with a polyol such as glycerin, pentaerythritol, trimethylol propane, sorbitol, tetrakis(2-hydroxypropyl) ethylene diamine, or ethylene oxide or propylene oxide adducts of these polyols in combination with the diisocyanate will yield a cross-linked polyurethane network.

The new diols of this invention can also be converted to useful polyester and polyamide block copolymers by the usual polyester and polyamide forming reactions, using either a simple monomeric unit such as the phthalic acids or esters, or using preformed polyesters or polyamides with appropriate reactive chain ends. Interfacial polymerization is advantageously used to prepare such materials by using acid chlorides of dicarboxylic acids or of carboxy ended polyesters or polyamides with the diols. Alternatively, an amine ended polyamide can be reacted with the chloroformate ended diol (formed by the reaction of the diol with phosgene) to give polyether-polyamide block copolymer joined by polyurethane links. The chloroformate ended diol can also be reacted by interfacial polymerization with hydrazine or simple diamines to form polyurethane type products. The diols can also be end-capped, by reaction with at least two moles of a di- or polyisocyanate, to give a product with reactive isocyanate end groups which can then be reacted with a diamine, such as hydrazine, ethylene diamine, phenylene diamine, etc., or an amine-ended polyamide, to give block-type copolymers containing urea links which are advantageous for increasing the softening point and improving the abrasion resistance of the polymer.

The crystalline diols produced as described above from crystalline poly(trans- or cis-butene-2 oxide) are especially useful in the preparation of polyurethane foams, which may be prepared as rigid, semi-rigid or elastomeric foams. Because of their crystallinity and high melting points, these new diols give final products which are advantageous over a wider temperature range than conventional foams. These new crystalline diols are particularly useful in the preparation of improved polyurethane foams when used in combination with amorphous poly(propylene glycol), or amorphous propylene oxide adducts of various polyols, to give, depending on the composition, rigid, semi-rigid or elastomeric products. The elastomeric foams are outstanding because of their improved tensile and tear strength and improved recovery characteristics. In rigid or semi-rigid foams, these crystalline diols can be the sole or major diol component combined with a diisocyanate, such as toluene diisocyanate, or a diisocyanate in combination with a small amount of a polyol such as trimethylol propane or glycerine, etc. Conventional rigid or semi-rigid foams based on amorphous poly(propylene glycol) are highly cross-linked by including large amounts of polyols and/or polyisocyanates. The rigid or semi-rigid foams of the crystalline diols of poly(2-butene oxides) are tougher and hence more useful at ordinary temperatures. The crystalline diols can also be used for the preparation of cast articles, for coatings, for binders as, for example, for rocket propellants, and for elastomeric fibers, films, etc.

The crystalline diols of this invention can be further modified to yield useful products. For example, they may be reacted in the presence of a base with other epoxides such as ethylene oxide, propylene oxide, butene-1 oxide, etc. Such adducts may be just diadducts to convert the hydroxyl end groups to more reactive hydroxyethyl (ethylene oxide reaction) or hydroxypropyl (propylene oxide reaction) end groups. Such products because of their reactivity with isocyanates are especially useful for foam, particularly for the very useful one-shot foam processes. The adducts may consist of large blocks (5 to 100 units) of ethylene oxide, amorphous propylene oxide, amorphous butene-1 oxides, etc. Such block polymers containing the crystallizing diol units of this invention are unique and are unusually useful surface active agents, adhesives, and protective colloids. The ethylene oxide type are especially useful as unique detergents, dispersing agents, antistatic agents, dyeing aids, additives or coatings for fibers to prevent soil redeposition during laundering, etc.

The above products can be made directly following the cleavage reaction when conditions are such that the products formed contains largely metal alkoxide end-groups. The cleaved product can be concentrated, if desired, and reacted directly with the desired alkylene oxide under appropriate conditions of concentration, temperature and time, depending on the alkylene oxide and the product desired. The metal alkoxide end-group products from the cleavage reaction may also be used to make other useful block polymers by reaction with styrene, acrylates, methacrylates, acrylonitriles and acrylamides.

The diols of this invention may be reacted with phosgene to give chloroformates which may be further reacted with diamines to form polyurethanes, with dialcohols to form polyesters or with sodium azide to give a reactive azide end-group.

The amorphous poly(cis-2-butene oxide) diol is useful for preparing urethane-type foams which are more rigid and less flexible than their amorphous poly(propylene glycol) counterparts. Also, because of the much lower reactivity of the hydroxyl end-groups to isocyanate compared to poly(propylene glycol), it is possible to prepare mixtures with di-or polyisocyanates which have advantageously long pot life and which can then be used for making cast articles by using a higher temperature cure. This is not possible with poly(propylene glycol) or related more reactive polyols.

The following examples illustrate the preparation of the diols of this invention. All parts and percentages are by weight unless otherwise indicated. All examples were run under a nitrogen atmosphere. The molecular weight of the polymers is indicated by their reduced specific viscosities (RSV). By the term "reduced specific viscosity" is meant $\eta_{sp./c.}$ determined on a 0.1% solution in chloroform at 25° C. unless otherwise indicated. The number average molecular weight (Mn) was determined in benzene (heating to dissolve the polymer when necessary) using a Mechrolab Vapor Pressure Osmometer. The calculated Mn was calculated from the hydroxyl analysis assuming 2 hydroxyls per chain. Hydroxyl analysis was determined by infrared and/or Zerewitinoff analysis. Where the melting point of the polymer is given, it was determined by differential thermal analysis (DTA) by the procedure described in Organic Analysis, vol. 4, pages 372–383, Interscience Publishers, New York, 1960.

Example 1

The poly(trans-2-butene oxide) used in this and the following example was prepared as described in U.S. 3,065,187.

Fifteen (15) parts of a crystalline poly(trans-2-butene oxide) containing 0.1% of phenyl-β-naphthylamine as an antioxidant and having an RSV of 2.1 was dissolved in 255 parts of anhydrous benzene at room temperature. Then, while stirring under nitrogen at 30° C., 0.96 part of lithium butyl in 6 parts of n-hexane was added. After stirring for 15 minutes at 30° C., 6 parts of anhydrous ethanol was added to shortstop the reaction. The reaction mixture was washed with 150 ml. of a 10% aqueous solution of hydrogen chloride, stirred for 15 minutes and then washed neutral with water. The solvent was evaporated, and the product was dried for 16 hours at 80° C. in vacuum. It amounted to 14.2 parts, had an RSV of 0.18 and an Mn of 4364. Infrared analysis showed 0.69% hydroxyl (Mn calculated of 4930) and no unsaturation. Zerewitinoff analysis showed 0.8% hydroxyl (Mn calculated of 4256). The highly crystalline solid diol had a melting point of 102° C.

Example 2

Seven and one-half (7.5) parts of a crystalline poly(trans-2-butene oxide) essentially free of antioxidant and having an RSV of 1.5 and a melting point of 98° C. was dissolved in 245 parts of n-heptane at 90° C. Then after cooling to 30° C. and while stirring under nitrogen and in a 30° C. bath, 1.73 parts of lithium butyl in 10 parts of n-hexane was injected. After 15 minutes' agitation, the reaction was stopped by adding 40 parts of anhydrous ethanol. An equal volume of ether was added and the product was then washed with 250 parts of 3% aqueous hydrogen chloride and then washed neutral with $H_2O$. Solvent was stripped off under vacuum and the product dried 16 hours at 80° C. in vacuum. There was thus isolated a waxy solid which amounted to 7.1 parts. It had an RSV of 0.06 and an Mn of 1094. Infrared analysis showed 3.4% OH (Mn calculated of 1186). The polymer had a crystalline melting point of 101° C.

Example 3

Twenty (20) parts of a poly(trans-2-butene oxide) having an RSV of 1.2 and containing 0.1% of phenyl-β-naphthylamine as stabilizer was dissolved in 163 parts of anhydrous benzene at room temperature. With stirring and at 30° C., 1.44 parts of lithium butyl in 9 parts of n-hexane was added. Almost immediately the reactor contents solidified to a gelled mass. After 10 minutes there was added during 5 minutes 150 parts of benzene with shaking, but the reaction mixture remained a gel. Eight (8) parts of anhydrous ethanol was then added and the reaction mixture immediately became fluid. It was washed with acid and the product was isolated as described in Example 1. The product so obtained amounted to 19.0 parts, was a somewhat tough, white solid having an RSV of 0.50 and an Mn of 9242. Infrared analysis showed 0.28% hydroxyl (Mn calculated of 12,100), and no double bonds or carbonyl groups could be detected.

Example 4

Twenty (20) parts of a poly(trans-2-butene oxide) having an RSV of 1.1 and containing 0.1% phenyl-β-naphthylamine was dissolved in 334 parts of benzene at room temperature. A solution of 1.92 parts of lithium butyl and 12 parts of n-hexane was stirred for 15 minutes at 30° C. The product was washed with acid and was isolated as described in Example 1. It amounted to 18.8 parts and was a hard, waxy solid having an RSV of 0.16 and an Mn of 2294. Infrared analysis showed 1.1% hydroxyl (Mn calculated of 3090), no double bonds and no carbonyl. Zerewitinoff analysis showed 1.22% hydroxyl (Mn calculated of 2790).

Example 5

Five-tenths (0.5) part of poly(trans-2-butene oxide) having an RSV of 0.95 was dissolved in 22 parts of anhydrous benzene. Then while stirring at 30° C., 0.13 part of tert-butyl lithium dissolved in 1.3 parts of n-heptane was added. After 15 minutes, the reaction was shortstopped by adding 0.4 part of anhydrous ethanol. The reaction mixture was washed with 25 ml. of a 10% aqueous solution of hydrogen chloride, washed neutral with water, evaporated, and dried. There was isolated 0.48 part of a waxy solid having an RSV of 0.09. Infrared analysis showed 3.6% hydroxyl (Mn calculated of 950) and no double bonds or carbonyl.

Example 6

The crystalline poly(cis-2-butene oxide) used in this example was prepared by the process described in U.S. 3,065,187. This polymer (7.33 parts), having an RSV of 4.3 as measured in tetrachloroethane at 100° C. and hence an Mn >100,000 and containing 0.3% of the antioxidant Santonox, i.e., 4,4'-thiobis-(6-tert-butyl-m-cresol), and having a melting point of 142° C., was dissolved in 334 parts of benzene by heating at 120° C. After cooling to 30° C., 0.96 part of lithium butyl in 6 parts of n-hexane was added. The reaction was stopped after 15 minutes by adding 4 parts of anhydrous ethanol. The reaction mixture was then washed with 100 ml. of a 10% aqueous solution of hydrogen chloride, washed neutral with water, stripped and dried. The diol so obtained amounted to 6.5 parts and was a white, somewhat waxy powder, largely insoluble in benzene and chloroform at room temperature, but soluble at the boiling point of these solvents. It had a melting point of 142° C., and an Mn of 1888 (corrected for the Santonox present in the polymer). Infrared analysis showed 1.8% hydroxyl (Mn calculated of 1890) and no unsaturation. The percent hydroxyl by Zerewitinoff was 1.61 (Mn calculated of 2200).

Example 7

A mixture of 2080 parts of dry toluene and 250 parts of cis-2-butene oxide was cooled under nitrogen to —75° C., and 130 parts of a 0.5 M solution of a triisobutylaluminum—0.5 water catalyst in n-heptane was added during 1.6 hours. The temperature rose during the first 15 minutes of the catalyst addition to —28° C., and then gradually dropped back to —67° C. at the end of the catalyst addition. The reaction mixture was stirred 0.8 hour more and then the temperature was raised to 30° C. A sample taken at this point showed a 95% conversion to a rubbery, amorphous polymer having a RSV of 2.7 as measured on a 0.1% solution in chloroform at 25° C.

The above reaction mixture at 30° C. was diluted with 1470 parts of dry toluene and 25.6 parts of lithium butyl dissolved in 146 parts of n-hexane was added. The temperature rose to 35° C. After 0.5 hour of stirring at 30–35° C., the reaction was shortstopped by adding 36 parts of anhydrous ethanol. The reaction mixture was stirred 0.5 hour with 1000 parts of 10% aqueous hydrogen chloride, washed neutral with water, stabilized with 0.05% of a commercial stabilizer, Topanol CA, (the condensation product of croton aldehyde with about 3 moles of 3-methyl-6-tert-butyl phenol) and then was filtered. The solvents were removed from the filtrate and the product was dried at 80° C. under vacuum. The amorphous diol so obtained amounted to 237 parts (95% yield) and was a viscous liquid which on analysis was found to contain 2.55% hydroxyl by infrared (Mn calculated of 1330). The Mn found was 1610.

Example 8

The procedure of Example 7 was repeated except that trans-2-butene oxide was used as the starting monomer and the polymerization reaction was run at 5 to 15° C. The polymer so produced had an RSV of 1.6. The crystalline poly(trans-2-butene oxide) diol produced on cleavage of the polymer contained 1.7% hydroxyl by infrared (Mn calculated of 2000).

The following examples illustrate the preparation of polyurethanes from the new diols of the poly(butene-2 oxide)s of this invention.

Example 9

The poly(trans-2-butene oxide) diol (1.000 part) prepared in Example 4 was mixed with 0.112 part of methylene di-p-phenyl diisocyanate, which was 97.5% pure based on isocyanate content, and 3.5 parts of anhydrous benzene. This is 100% of the theoretical amount of the diisocyanate based on the diol having a number average molecular weight of 2294 and using 1 mole of diisocyanate per mole of the diol. The mixture was heated for 6 hours at 120° C. after which the solvent was evaporated off under nitrogen on a steam bath and the product was dried for 16 hours at 80° C. under vacuum. The product so obtained was 95% soluble in benzene and the soluble fraction had an RSV of 0.69. It was a hard, tough solid which adhered strongly to glass and which could be cold drawn.

Example 10

This example demonstrates the use of a poly(trans-2-butene oxide) diol where each hydroxyl is reacted with a triisocyanate to yield a tetraisocyanate.

The poly(trans-2-butene oxide) diol (1.048 parts) of Example 4 was mixed, under nitrogen, with 3.98 parts of a benzene solution (2.72% NCO) of the reaction product of 3 moles of toluene diisocyanate with 1 mole of trimethylolpropane. This corresponds to a 6% excess over that required for 3 NCO per hydroxyl (based on an Mn of 2294 and 1.48% hydroxyl). After heating for 6 hours at 120° C., part of the very viscous solution of this tetraisocyanate was cast as a film on a glass plate. The film was non-tacky and after 10 days in air at room temperature the film was removed from the glass to yield an unsupported free film.

The remainder of the tetraisocyanate solution was then heated at 100° C. to remove the solvent, after which it was heated under nitrogen at 90° C. for 22 hours. The product was then extracted with 3.5 parts of anhydrous methyl isobutyl ketone, whereby 0.14 part of a wax-like product was removed. It was then extracted with 5 parts of benzene for 3 days and again with 6 parts of benzene for 24 hours. After two further benzene washes, the insoluble product was dried for 16 hours at 80° C. under vacuum to yield 1.194 parts of a film-like, tough solid.

Example 11

The poly(trans-2-butene oxide) diol (1.048 parts) of Example 4 was mixed under nitrogen, with 1.33 parts of a benzene solution of the reaction product of 3 moles of toluene diisocyanate with 1 mole of trimethylol propane (2.72% NCO). This corresponds to a 6% excess over 1 isocyanate per hydroxyl, based on an Mn of 2294 and 1.48% hydroxyl. The mixture was heated at 120° C. for 6 hours, after which the solvent was vented and the reaction mixture evacuated for 1 minute at 120° C. During the next 6 hours of heating at 120° C., the reaction mixture became a solid, but somewhat cheesy mass. Heating was continued for an additional 23 hours after which the solid mass was dried for 16 hours at 80° C. under vacuum. The product was a tough, rubbery solid. It was extracted with benzene for 3 days at room temperature and then washed 3 times with benzene. The dried benzene-insoluble product was a tough solid and amounted to 0.965 part. The benzene-soluble fraction was recovered and amounted to 0.27 part. It was a brittle, slightly waxy film.

Example 12

A mixture of 9.75 parts of the crystalline poly(trans-2-butene oxide) diol of Example 8, 87.8 parts of an amorphous liquid poly(propylene glycol) having an Mn of 2000 and 43.5 parts of tolylene diisocyanate (an 80:20 mixture of the 2,4 and 2,6 isomers), which was 5.1 NCO per OH, was heated at 80° C. to 120° C. for 1 hour to form a prepolymer containing excess diisocyanate. After cooling to room temperature, 98% of the translucent, white, viscous liquid prepolymer mixture was mixed with a blend of water (3.44 parts), triethylene diamine (0.48 part), stannous octoate (0.29 part) and silicone oil (0.96 part) for 5 seconds at 2400 r.p.m. The NCO to total hydroxyl ratio for the final foam was 1.05. The mixture was then poured into an open box and foamed with a moderate exotherm. When foaming ceased, it was post cured for 5 minutes at 105° C. The resultant elastomeric foam was completely insoluble in methylene chloride (as shown by 16 hours of continuous extraction), demonstrating that the poly(trans-2-butene oxide) diol had been completely incorporated. It had the following physical properties compared with a similar foam made without the crystalline poly(trans-2-butene oxide) diol.

|  | With diol | Without diol |
|---|---|---|
| Density, lb./cu. ft. | 2.46 | 2.9 |
| Tensile, p.s.i. | 29 | 13 |
| Elongation, percent | 340 | 366 |
| Tear resistance, lb./in. | 4.3 | 3.9 |

Thus, the foam produced with the poly(trans-2-butene oxide) diol has improved tensile and tear strength.

Example 13

The procedure of Example 12 was repeated except that an 80:20 blend of the amorphous poly(propylene glycol) and crystalline poly(trans-2-butene oxide) diol (88.0 and 22.0 parts, respectively), was used together with 47.9 parts of the tolylene diisocyanate. The prepolymer (96.2% of it) was foamed with 3.84 parts of water, 0.53 part of triethylene diamine, 0.53 part of stannous octoate and 1.07 parts of silicone oil (NCO/OH of 1.00 for the final foam). The foam so obtained had the following physical properties:

Density, lb./cu. ft. _____ 2.87
Tensile, p.s.i. _____ 11
Elongation, percent _____ 90
Tear Resistance, lb./in. _____ 4.6

The decreased elongation shows a decrease in elastomeric character and the tear strength was significantly increased.

Example 14

A crystalline poly(trans-2-butene oxide) diol was prepared as described in Example 4 except that toluene was used as the diluent instead of benzene and the stabilizer was Topanol CA instead of phenyl-β-naphthylamine. The diol so produced had an Mn of 2100.

A mixture of 106 parts of the diol and 45.6 parts of tolylene diisocyanate (80:20 mixture of 2,4 and 2,6 isomers) was heated for 2 hours at 120° C. to give a prepolymer which on cooling to room temperature was a white, wax-like solid. It was then heated to 80° C. and a mixture of water (3.82 parts) and silicone oil (1.06 parts) was added after which it was stirred at high speed, foaming occurring with a fair exotherm while hot. It was post-cured for 10 minutes at 100° C. to give a foam of uniform cell structure and 13.9 lb./cu. ft. density.

What I claim and desire to protect by Letters Patent is:

1. As a new composition of matter, a diol of a poly(butene-2 oxide) wherein each of the hydroxyl groups is attached to a terminal carbon of the polymer chain, said diol having a number average molecular weight of from about 1,000 to about 20,000.

2. The product of claim 1 wherein the diol has a number average molecular weight of from about 2,000 to about 10,000.

3. The product of claim 2 wherein the diol is a diol of poly(cis-butene-2 oxide).

4. The product of claim 2 wherein the diol is a diol of poly(trans-butene-2 oxide).

5. A crystalline diol of poly(cis-butene-2 oxide) having a number average molecular weight of from about 1,000 to about 20,000, the hydroxyl groups of said diol being attached to the terminal carbon atoms of the polymer chain.

6. A crystalline diol of poly(trans-butene-2 oxide) having a number average molecular weight of from about 1,000 to about 20,000, the hydroxyl groups of said diol being attached to the terminal carbon atoms of the polymer chain.

7. An amorphous diol of poly(cis-butene-2 oxide) having a number average molecular weight of from about 1,000 to about 20,000, the hydroxyl groups of said diol being attached to the terminal carbon atoms of the polymer chain.

References Cited

UNITED STATES PATENTS

| 2,870,100 | 1/1959 | Stewart et al. | 260—2 |
| 2,522,155 | 9/1950 | Ballard et al. | 260—615 |
| 3,149,083 | 9/1964 | Gmitter | 260—77.5 |

WILLIAM H. SHORT, *Primary Examiner.*

T. PERTILLA, *Assistant Examiner.*

U.S. Cl. X.R.

117—161; 260—2.5, 77.5, 78.4, 615, 830